Jan. 14, 1936.   W. C. STATE ET AL   2,028,078
TIRE BUILDING APPARATUS
Filed Feb. 21, 1933   9 Sheets-Sheet 2

Inventors
Will C. State
Meindert Lammertse
Charles E. Gardner
By
Attorney

Jan. 14, 1936.　　W. C. STATE ET AL　　2,028,078
TIRE BUILDING APPARATUS
Filed Feb. 21, 1933　　9 Sheets-Sheet 3

Inventors
Will C. State
Meindert Lammertse
Charles E. Gardner
By
Attorney

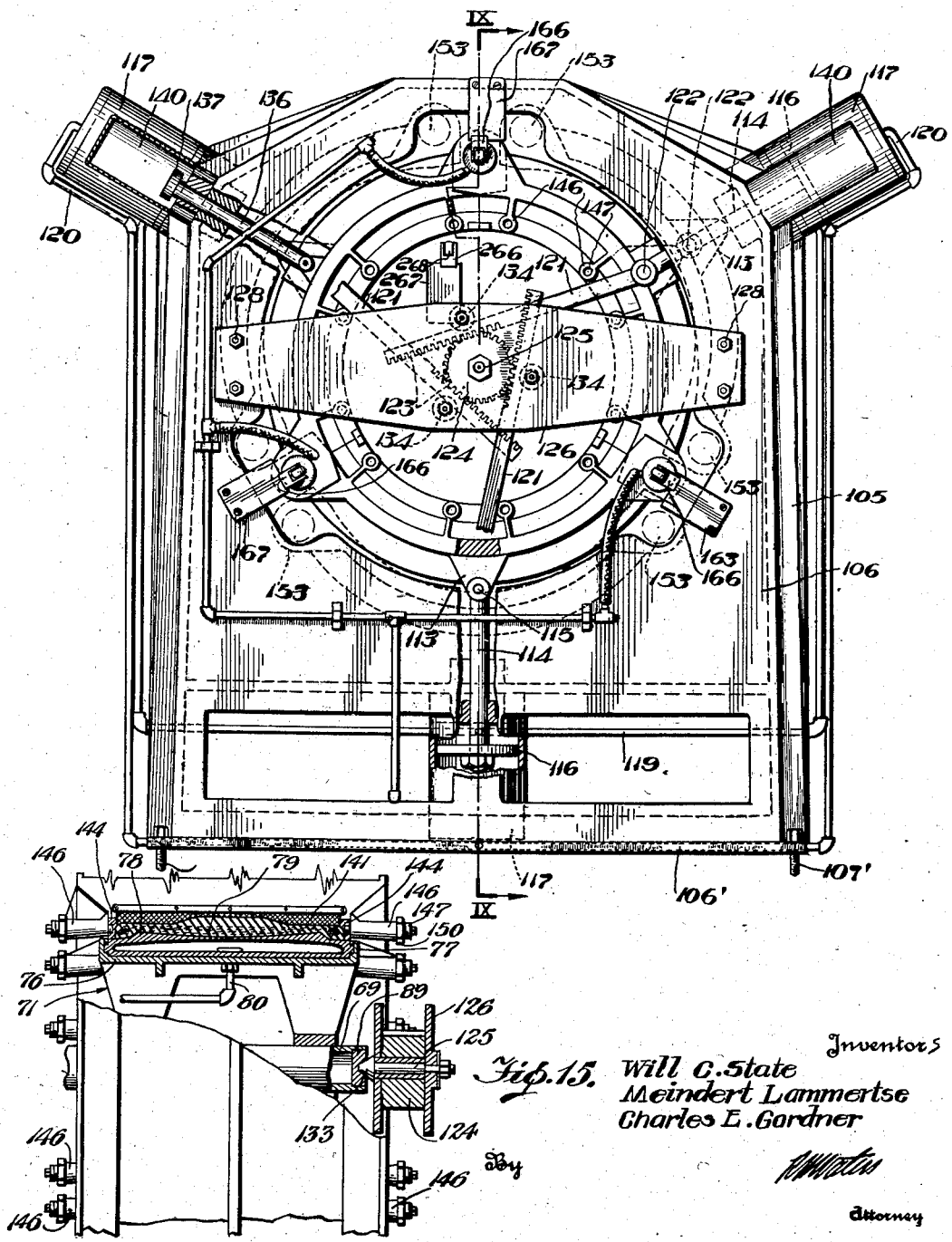

Jan. 14, 1936.　　　W. C. STATE ET AL　　　2,028,078
TIRE BUILDING APPARATUS
Filed Feb. 21, 1933　　　9 Sheets-Sheet 5
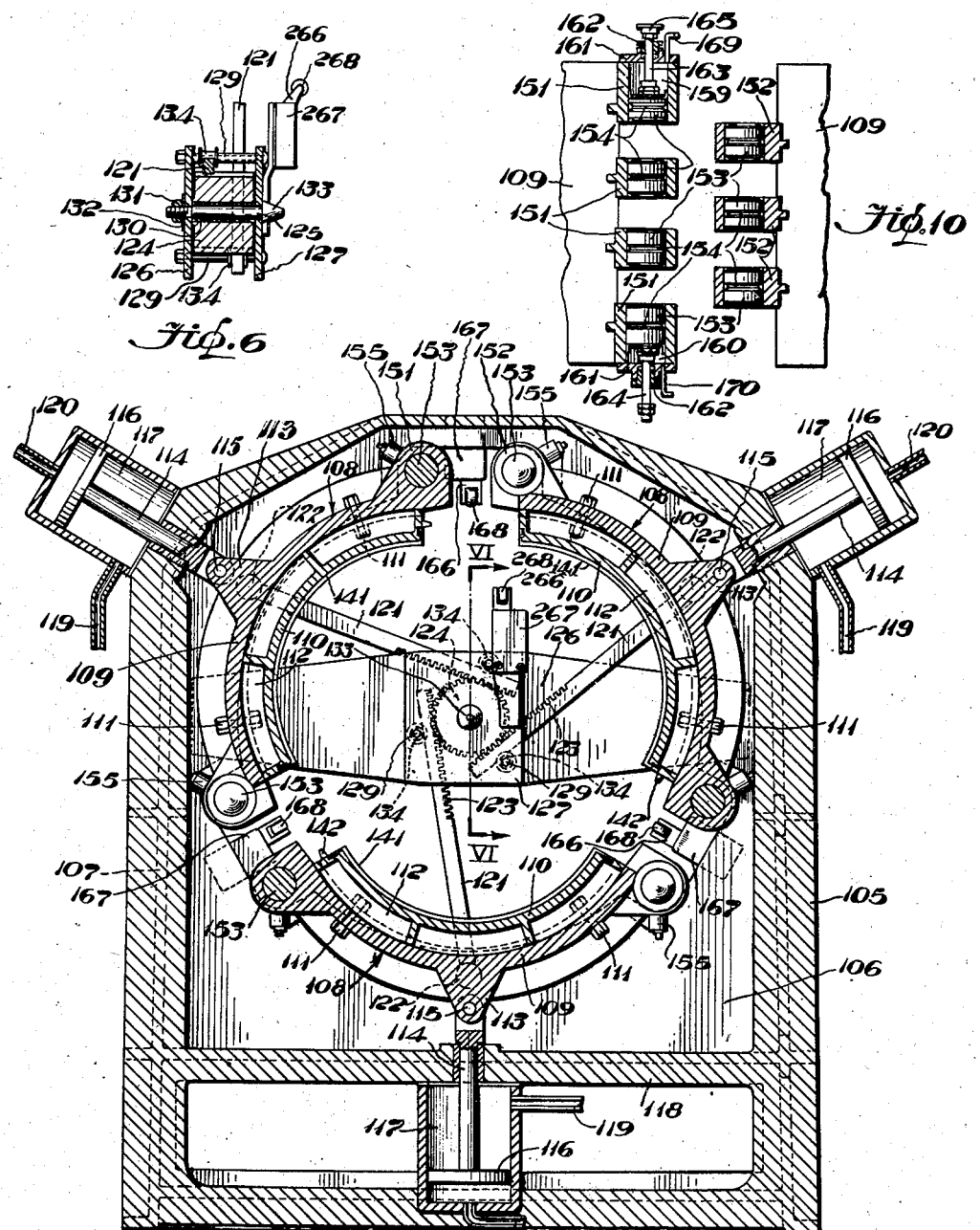
Inventors
Will C. State
Meindert Lammertse
Charles E. Gardner
By
Attorney Inventors
Will C. State
Meindert Lammertse
Charles E. Gardner Jan. 14, 1936.  W. C. STATE ET AL  2,028,078

TIRE BUILDING APPARATUS

Filed Feb. 21, 1933  9 Sheets-Sheet 7

Inventors
Will C. State
Meindert Lammartse
Charles E. Gardner

By

Attorney

Jan. 14, 1936.  W. C. STATE ET AL  2,028,078
TIRE BUILDING APPARATUS
Filed Feb. 21, 1933  9 Sheets-Sheet 8
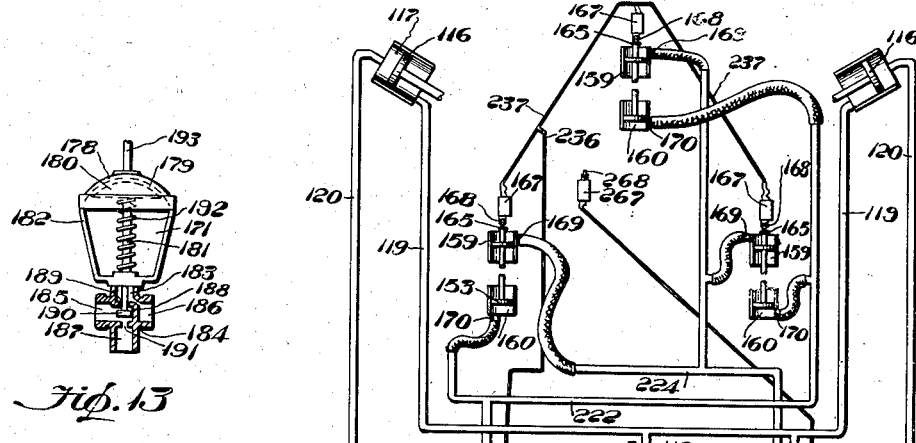
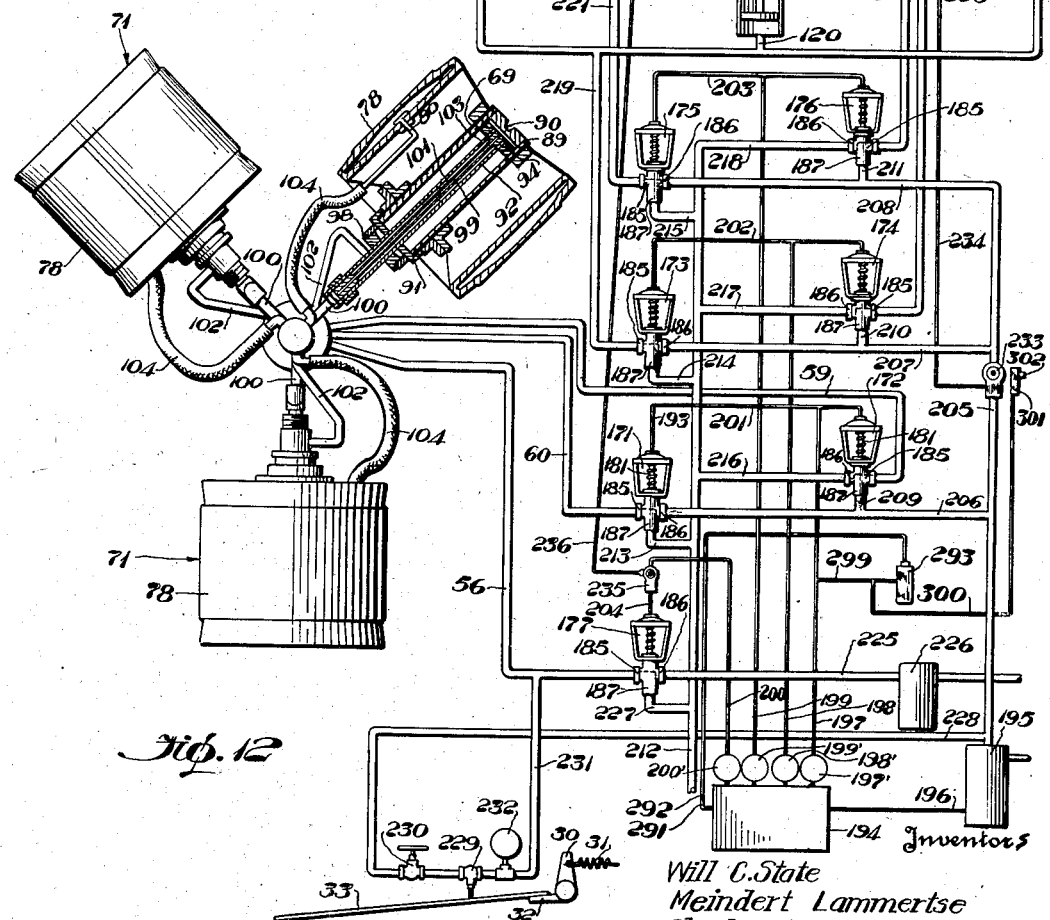
Fig. 13
Fig. 12
Inventors
Will C. State
Meindert Lammertse
Charles E Gardner
By
Attorney Patented Jan. 14, 1936

2,028,078

UNITED STATES PATENT OFFICE 2,028,078

TIRE BUILDING APPARATUS

Will C. State and Meindert Lammertse, Akron, and Charles E. Gardner, Cuyahoga Falls, Ohio, assignors, by mesne assignments, to Wingfoot Corporation, Wilmington, Del., a corporation of Delaware Application February 21, 1933, Serial No. 657,778

51 Claims. (Cl. 154—10)

This invention relates to apparatus for building tires and it relates more particularly to apparatus to be used in practicing the method of constructing pneumatic tires described and claimed in the copending application of W. C. State, Serial No. 607,133, filed April 23, 1932, now Patent 2,007,909 granted July 9, 1935. Also, this invention is an improvement over the apparatus described and claimed in Patent No. 1,785,659, granted December 16, 1930.

In the aforesaid application there is disclosed a method of building pneumatic tires which comprises broadly making up the different portions of the tire in separate and distinct units, assembling the units in band form in unbonded relation, and then bonding all the bands together in unvulcanized condition in one operation. The apparatus of the present application is adapted more particularly to perform the step, in said method, of bonding all the bands together in unvulcanized condition in one operation, but it will readily be seen that the apparatus is capable of other uses. This apparatus is only generally described and shown in the said copending application and has not been claimed therein.

It is an object of this invention to provide an apparatus that will bond or unite the bands of a pneumatic tire in one operation without tension on the bands.

Another object is to provide an apparatus that will unite the bands of the tire in one operation with uniform and equally distributed pressure, resulting in less air being entrapped in the carcass than was usual heretofore.

A further object is to provide novel pneumatic means for pressing the air out of the tire assembly in one operation.

A further object is to provide novel means for forcing the air out of the tire assembly by applying a compacting pressure to operate on the assembly progressively from the center to the edges thereof.

A further object is to provide an apparatus which is automatic and continuous in performing its cycle of operations and which contains features insuring its safe operation.

The foregoing and other objects and advantages of the invention will become apparent from the following description in connection with the accompanying drawings, wherein we have shown one embodiment of the invention.

Broadly, the invention may be said to comprise an annular chamber having radially movable walls to permit the insertion of an unbonded tire assembly into the chamber and the subsequent withdrawal of the assembly therefrom in bonded condition. Adjacent the chamber, a rotatable turret provided with a plurality of annular drums, is arranged, each drum being provided on its periphery with an inflatable member adapted to receive an unbonded tire assembly. Each drum can be moved into and out of the chamber and, while in the latter, the unbonded assembly is pressed against the walls of the chamber by inflating the member arranged on the periphery of the drum. Thus, the tire assembly is bonded within the chamber and subsequently withdrawn therefrom.

In the drawings:

Fig. 4 is a rear elevation of the chamber with parts broken away and shown in section;

Fig. 5 is a section taken substantially on line V—V of Fig. 2, with parts shown in elevation;

Fig. 6 is a section taken substantially on line VI—VI of Fig. 5;

Fig. 10 is a partial sectional view through the section locking means;

Fig. 12 is a diagrammatic showing of the operating means for the apparatus;

Fig. 13 is a section through one of the diaphragm valves;

Fig. 15 is a partial sectional view showing a portion of a drum with a tire assembly thereon, within the chamber.

Figure 1:
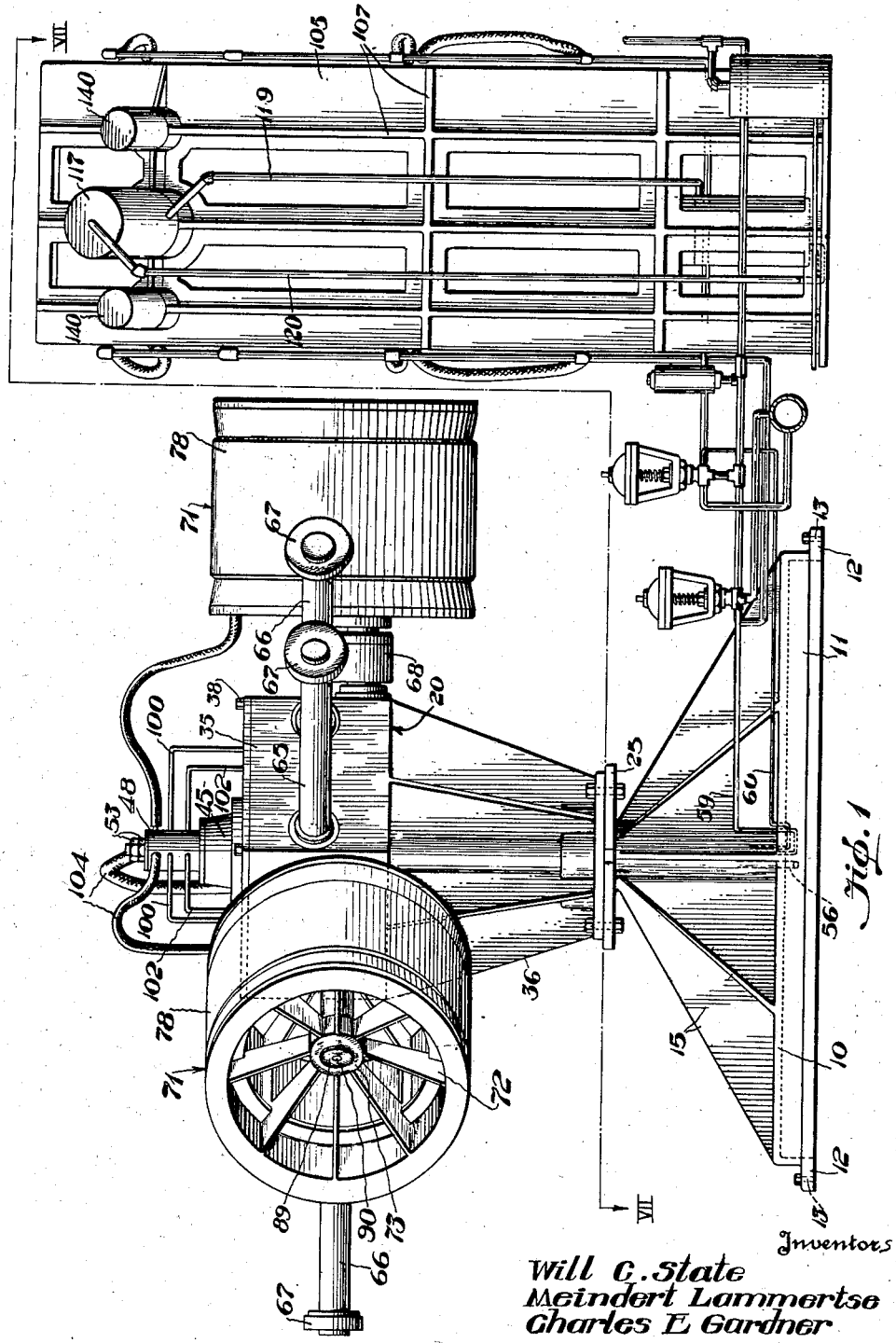
Fig. 1 is a side elevation of the apparatus.
Figure 2:
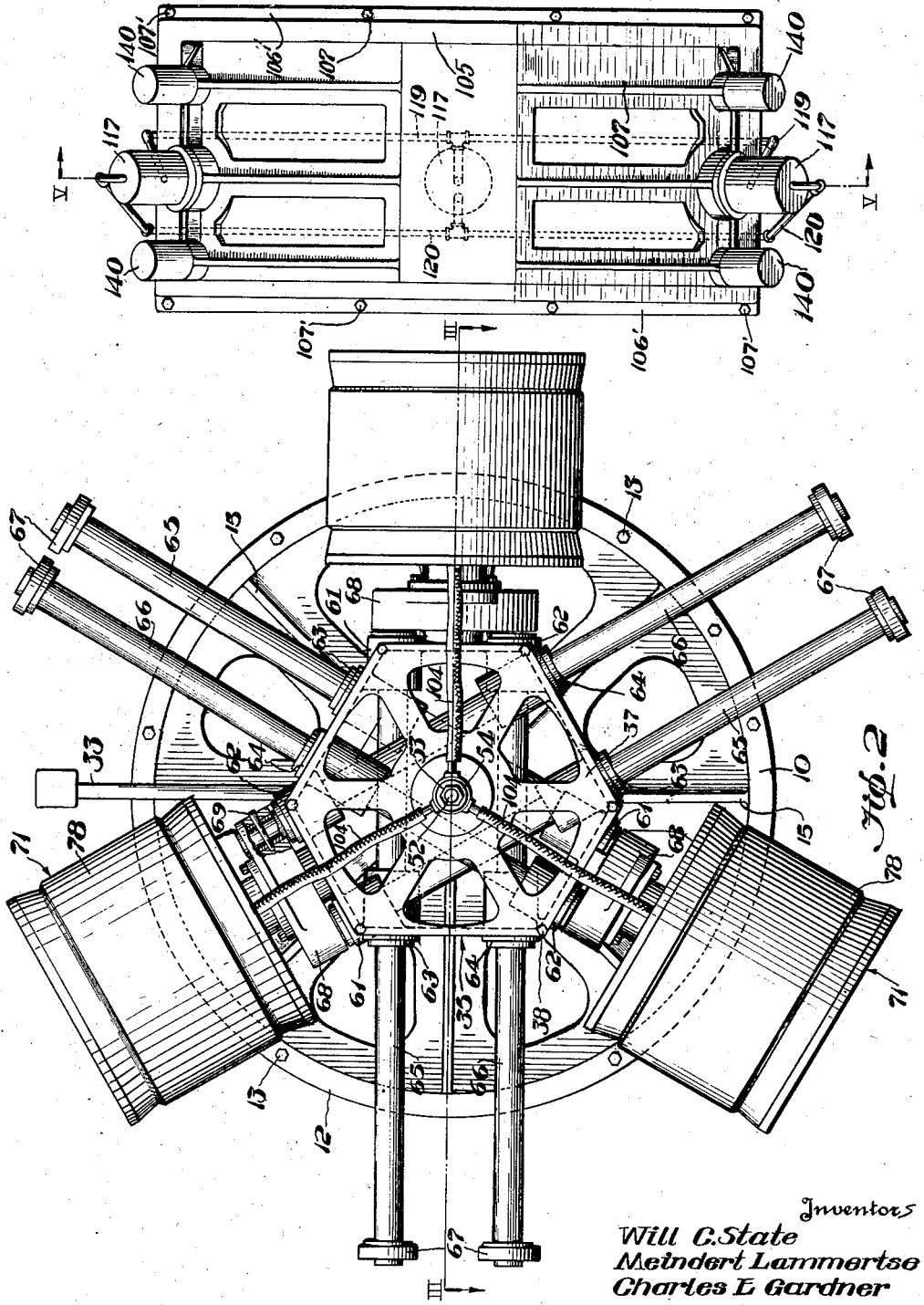
Fig. 2 is a plan view, with operating valves omitted.
Figure 3:
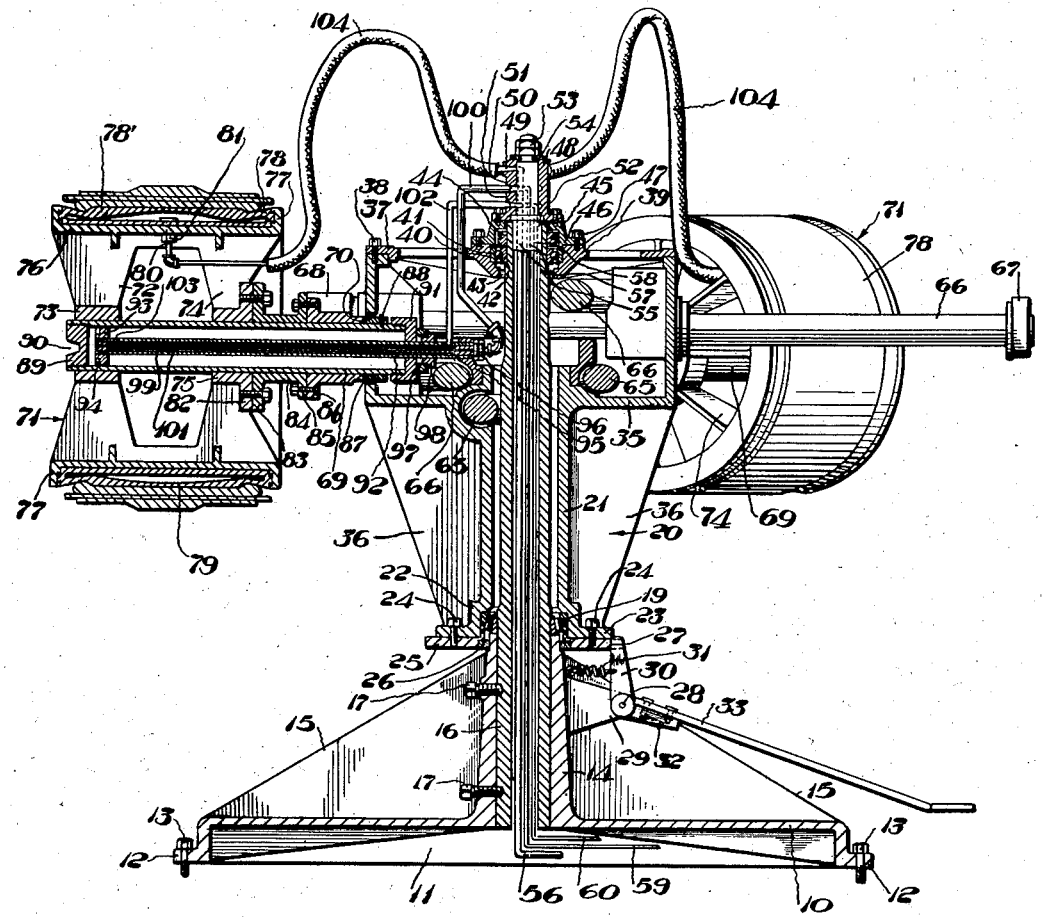
Fig. 3 is a section taken substantially on line III—III of Fig. 2, with parts shown in elevation.

Referring to Figs. 1, 2 and 3 of the drawings, the numeral 10 indicates an annular base, which preferably is formed hollow as indicated at 11 and is provided with a flange 12 adapted to receive suitable securing means 13 whereby the base may be secured to a foundation, such as a floor. The base is formed with an integral, hollow, vertical sleeve 14 (see Fig. 3), and a plurality of strengthening ribs 15 extend between this sleeve and the base. A vertical, hollow, stationary shaft 16 is held in the sleeve 14 by suitable securing means, such as bolts 17 threaded through the sleeve and into the shaft. The upper extremity of the sleeve 14 provides a bearing surface which receives a roller bearing 19 arranged below a rotatable turret indicated as a whole by the numeral 20.

Figure 7:
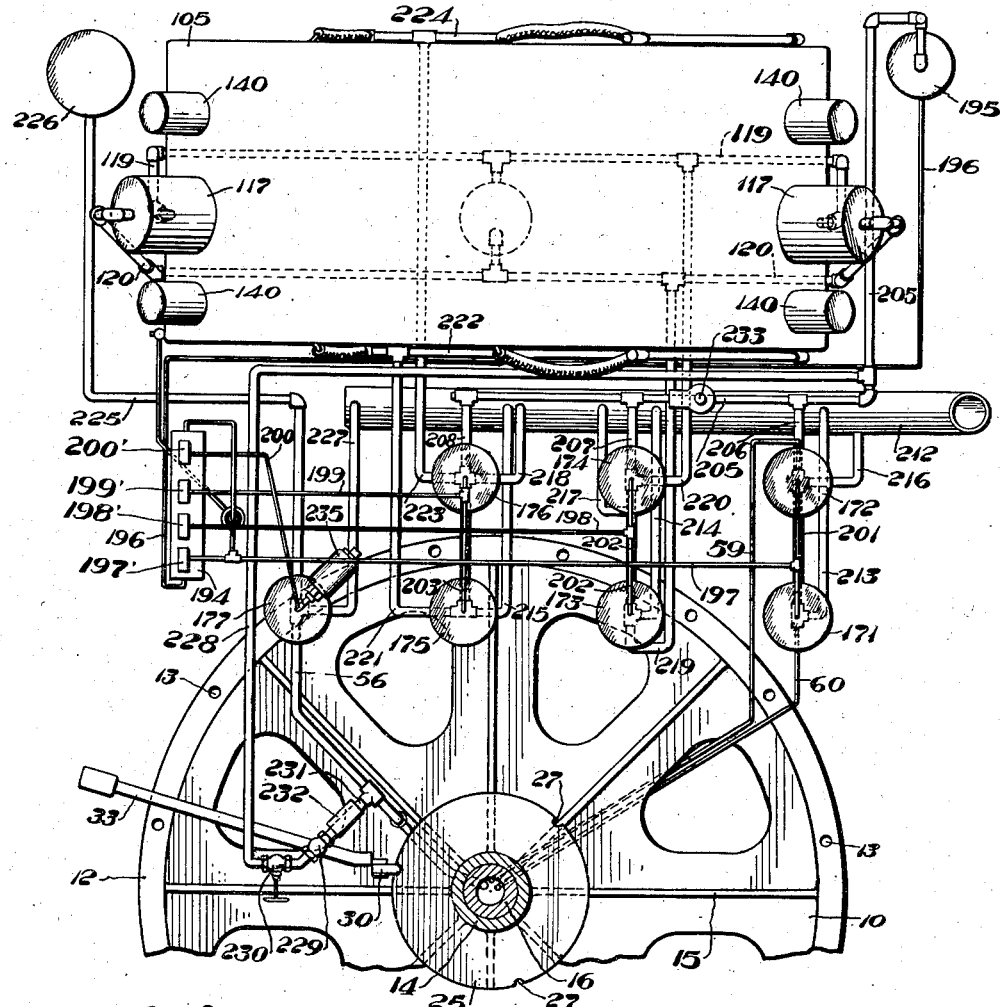
Fig. 7 is a section taken substantially on line VII—VII of Fig. 1, with parts shown in elevation.

As shown in Fig. 3, the turret is provided with a vertical, hollow, sleeve portion 21 which is enlarged adjacent its lower end as indicated at 22 to properly receive the bearing 19. Also, an annular flange 23 is formed on the lower extremity of the sleeve 21, and securing means, such as bolts 24, secure this flange to a rotatable alining plate 25. A packing ring 26 is arranged between the alining plate and the sleeve 14. This alining plate is provided with a plurality of notches 27 (see Fig. 7) to aline the turret in selected positions, as will be later more fully understood. In the present instance, three of the notches 27 are provided and they are arranged approximately 120 degrees apart.

Means are provided for entering either of the notches and holding the turret in fixed position. As shown, this means comprises a bell crank lever pivoted at 28 to a projecting lug 29 formed integral with the sleeve 14. The upper arm 30 of the bell crank lever is arranged whereby its upper extremity will fit within the notches 27 and a spring 31 is arranged between the base 14 and the arm 30 to urge the latter normally into proper position within one of the notches 27. The lower arm 32 of the bell crank has secured thereto one end of a foot pedal 33 and the opposite end of the latter is extended whereby it may be engaged by the operator of the machine. With the construction described it will be obvious, that the bell crank will be held in either of the notches 27 by the spring 31, but when the foot pedal 33 is depressed, the lever will be moved out of engagement with the notches.

The body portion of the turret 20, in this instance, preferably comprises an integral, box-like, hexagonal structure 35 and a plurality of strengthening ribs 36 are arranged between this body portion and the sleeve 21. A perforated cover plate 37 is arranged on the body portion and is secured thereto by means of bolts 38, or the like. This cover plate is formed with a hub 39 provided with a cut out portion 40 which receives a ball bearing 41 the inner surface of which rests on a shoulder 42 formed on the stationary shaft 16. The hub 39 also is provided with a suitable packing ring 43.

At its upper extremity, the stationary shaft 16 is threaded to receive a lock nut 44 and a bearing cover 45 is arranged outwardly of this shaft and nut. A flange 46 of the bearing cover is suitably secured to the hub 39 by means of bolts 47 or the like. Secured to the bearing cover 45 is a rotatable distributor housing 48 provided with a plurality of large openings 49 and a plurality of small openings 50 and 51 respectively. In this instance, there are three each of the openings 49, 50 and 51, which are arranged in groups of three, approximately 120 degrees apart, with each group of openings arranged substantially as shown in Fig. 3.

A stationary distributor 52 is arranged within the housing 48 and the skirt portion of the distributor is fitted in the end of the shaft 16, a suitable shoulder being provided in the housing to receive the upper end of the skirt portion. The body portion of the distributor extends through the housing and the neck of the distributor is threaded to receive lock nuts 53 which secure the distributor within the housing without preventing rotation of the latter. If desired, a washer or dust cap 54 may be arranged between the housing and the nuts 53. The distributor 52 is provided with a large port 55 which is adapted to communicate at one end with one of the openings 49 in the housing, while the opposite end of this port is connected to a high pressure conduit 56. Ports 57 and 58 also are provided in the distributor to communicate at one end with the openings 50 and 51 respectively, while the opposite ends of these ports are connected to conduits 59 and 60 respectively.

It will be apparent from the foregoing description that the turret is mounted for rotation and that the distributor housing will rotate with the turret, but the distributor remains stationary and permits the passage of fluid into the openings 49, 50 and 51 of the housing when a group of these openings becomes alined with the ports 55, 57 and 58. It will be recalled that the notches 27 in the alining plate also are spaced approximately 120 degrees apart and the arrangement is such that when any of the notches is engaged and held in position by the bell crank lever, one group of openings 49, 50 and 51 will be alined with the ports in the distributor. In this manner, the various groups of openings in the housing will successively be brought into alinement with the distributor ports as the turret is rotated.

As best shown in Fig. 2, the turret is provided with six walls, but this number may be increased or decreased, as desired, and three of the walls are provided with openings which receive bearing bushings 61 and 62 respectively, while each wall opposite the walls receiving these bushings is provided with openings receiving bearing bushings 63 and 64 respectively. Spaced pairs of horizontal guide members 65 and 66 are slidably mounted within these bushings as clearly indicated in Fig. 2 and the outer end of each guide member is provided with a stop member 67 which serves as a safety means to prevent movement of the guide members beyond the stops, although ordinarily, in actual practice, the movement of these members does not require the use of the stops. The forward ends of the respective pairs of guide members are connected to a crosshead 68 in any suitable manner, such as by a pin 69 extending through alined slots in the respective members, as shown in Fig. 2.

As more clearly shown in Fig. 3, a cylinder 69 extends through each crosshead 68 and into an opening 70 in the turret wall between the bushings 61 and 62. These cylinders are mounted for movement with the crossheads. Obviously, three cylinders are provided, but as they are substantially the same in construction, a description of one will suffice for all. Each of the cylinders 69 serves as a shaft for a drum rigidly secured thereto and indicated as a whole by the numeral 71. Each drum is formed with an outer spider 72 secured to a hub 73 which may be fixedly secured to the cylinder 69 in any suitable manner. Also, each drum is provided with an inner spider 74 secured to a hub 75 which also may be fixedly secured to the cylinder in any suitable manner.

Each drum is provided with an annular rim 76 having outwardly extending flanges 77 adapted to receive the sides of an annular inflatable member 78, preferably formed of flexible material, such as rubber reinforced with cord fabric, or the like. The inner surface of this inflatable member may be secured to the rim in any desired manner, such as by cement. Each inflatable member has a crowned outer surface 78' which is provided with a thin portion 79 adjacent the center thereof for a purpose to be described, and a threaded stem 80, permitting the passage of fluid into and out of the inflatable member, extends through the rim and is secured thereto by a nut 81.

Each inner spider hub is provided with a flange 82 to which is secured a flange 83 of a spacing collar 84. The latter collar also is provided with a flange 85 which is secured to a flange 86 of the crosshead 68. Forwardly of each crosshead 68 a securing collar 87 is arranged on the cylinder 69 and a set screw 88 or the like secures this collar to the cylinder.

At the outer end of each cylinder 69, a closure plug 89 is threaded thereinto and a conical or tapered opening 90 is provided in each plug for a purpose to be described. The inner end of each cylinder has a threaded closure member 91 secured thereto which is provided with a central aperture receiving a stationary piston rod 92. A piston head 93, provided with one or more piston rings 94, is secured to the outer end of each piston rod and the inner ends of the latter extend through a support 95 formed integral with the turret body. Lock nuts 96 are threaded on the inner end of each piston rod to secure it properly in position. Each closure member 91 is provided with an apertured boss 97 receiving a threaded packing gland 98 surrounding the piston rod.

It will be noted that each piston rod and head is provided with a central passageway 99 communicating at one end with the interior of the cylinder outwardly of the piston head. The opposite end of each passageway 99 communicates with a conduit 100 which leads to one of the small openings 50 in the distributor housing 48. Each piston rod also is provided with an annular passageway 101 arranged outwardly of the passageway 99 and communicating at one end with a conduit 102 leading to one of the small openings 51 in the distributor housing, while the opposite end of the passageway 101 communicates with a port 103 in the piston rod which leads to the interior of the cylinder inwardly of the piston head. Also, a flexible conduit 104 communicates with each large opening 49 in the distributor housing and the stem 80 of each inflating member.

It will be apparent that each drum 71 and cylinder 69 is mounted for horizontal reciprocating movement. When fluid is admitted through the conduit 100 to the outer face of the piston head, the drum and its associated parts will be moved to the left of the position shown in Fig. 3 and when fluid is admitted through the conduit 102 to the inner face of the piston head, and released from the conduit 100, the drum will return to the position shown in Fig. 3.

Referring to Figs. 1, 2, 4, 5, 7 and 9, the numeral 105 indicates a box-like frame which is open in the front and partially closed in the rear by an apertured plate 106, a plurality of strengthening ribs 107 being used to reinforce this frame, and a plurality of cut away portions being provided in the sides and top of the frame to reduce the weight thereof. Base flanges 106' are provided on the frame and securing means, such as bolts 107', may be used to secure the frame to a foundation, such as the floor. Mounted for radial movement in the frame are a plurality of sections indicated as a whole by the numeral 108 (see Fig. 5) and these sections form a chamber in which the drums 71 are successively received. In this instance, three sections 108 are utilized, but it will be obvious that any desired number may be used. Each section 108 comprises an outer portion 109 and an inner portion 110 secured to the outer portion by means of nuts and bolts as indicated at 111, the inner portions being cut out as shown at 112 to reduce the weight thereof. Each outer portion 109 is provided with an integral lug 113 to which one end of a piston rod 114 is pivotally secured as indicated at 115. The outer end of each piston rod 114 is provided with a piston head 116 movable within a cylinder 117 cast integral with or suitably secured to the frame 105. As shown in Fig. 5, the lower cylinder 117 is secured between a partition 118 in the frame, and the base of the latter, while the upper cylinders 117 project outwardly from the frame. Each cylinder 117 receives conduits 119 and 120 leading respectively to the inner and outer ends of the cylinders.

Each section 108 also has one end of a rack bar 121 pivoted thereto as at 122 (see Figs. 4, 5 and 9), and the free extremity of each rack bar is provided with teeth 123 adapted to mesh with similar teeth of a pinion 124 rotatably mounted on a shaft 125 secured between spaced plates 126 and 127. The plate 126 extends across the aperture in the rear plate 106 of the frame and is secured to this plate as at 128. The plate 127 is smaller in size than the plate 126 and is held in position by bolts 129 secured between the two plates. In order that these plates 126 and 127 will be spaced apart properly, a spacing collar 130 (see Fig. 6) is arranged on the shaft 125. A nut 131 is threaded on the outer end of the shaft 125 with a washer 132 arranged between this nut and the plate 126, while the inner end of shaft 125 is provided with an enlarged conical or tapered surface 133 adapted to fit into the opening 90 of the cylinder plug 89 when any of the drums 71 are in the chamber, in order to insure proper centering of the drum in the chamber. Each of the bolts 129 carry rollers 134 rotatably mounted thereon but fixed against longitudinal movement. As clearly shown in Figs. 4 and 5, each roller 134 is engaged by the side of a rack opposite to the teeth in order to hold the rack teeth in mesh with the pinion teeth at all times. With the pinion and rack arrangement as described, it will be apparent that the movement of the sections 108, inwardly or outwardly, will be uniform at all times.

Figure 9:
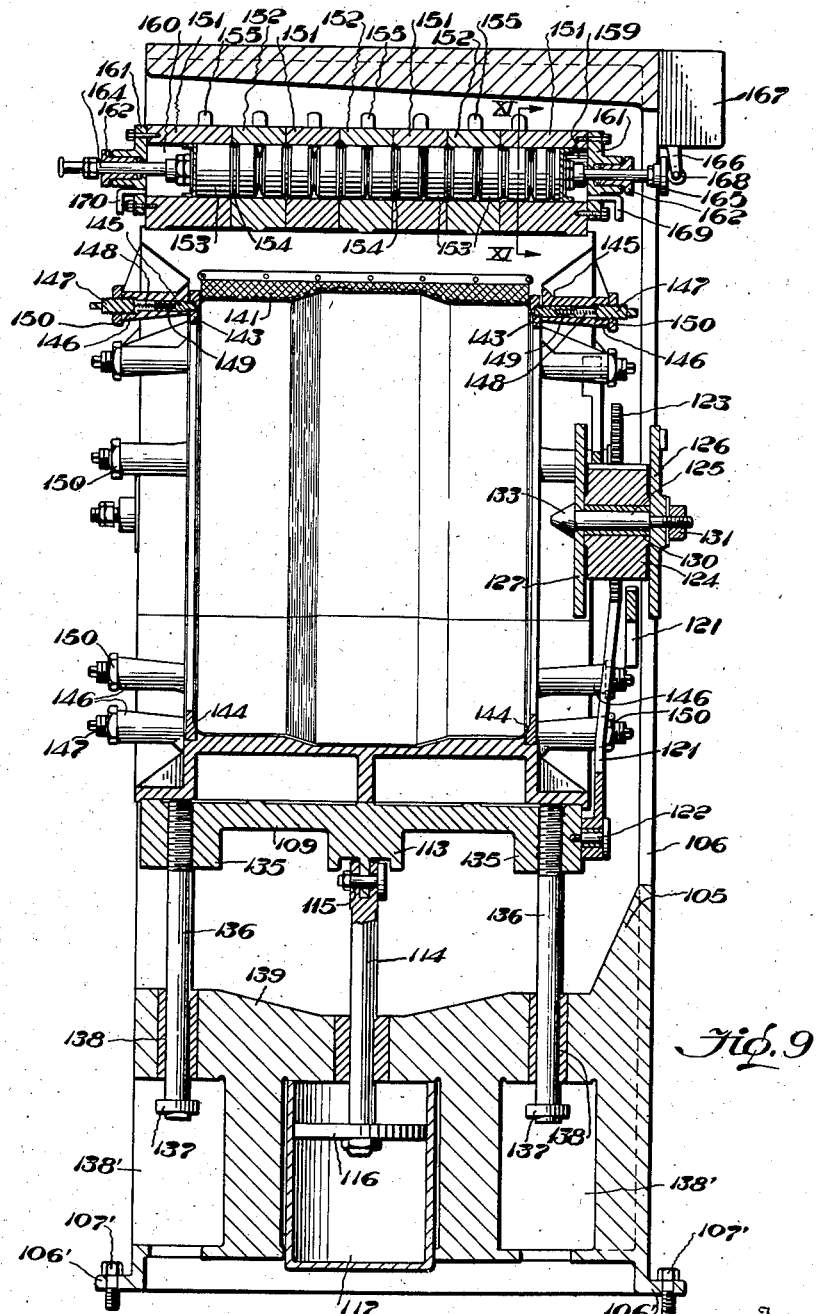
Fig. 9 is an enlarged section taken substantially on line IX—IX of Fig. 4 with parts shown in elevation.

To guide the chamber sections during their radial movement, each portion 109 is provided with enlargements 135 which receive the threaded inner ends of guide rods 136 (see Fig. 9). These guide rods are provided on their outer extremity with stop members 137, and the lower rods, shown in Fig. 9, are slidable through suitable guideways 138 into pockets 138' arranged in a partition 139 extending transversely across the lower portion of the frame 105. The guide rods 136 associated with the two upper sections of the chamber extend through the frame into bosses 140 arranged on opposite sides of the upper cylinders 117 (see Fig. 4).

The inner surface of each portion 110 preferably is provided with fabric 141 cemented or otherwise suitably secured thereto and dowel pins 142 are provided on one end of each portion 110 to be received in suitable openings in the opposite end of the next adjacent similar portion when the sections are moved together, as will readily be understood.

Referring again to Fig. 9, adjustable side rings or bead engaging flanges 143 are arranged on the sides of the chamber sections, these rings being sectional and commensurate in size with the chamber sections. The inner surface of each ring is curved substantially as shown at 144 to receive the bead portions of a tire band assembly which is inserted into the chamber. These rings are held in place by a plurality of bolts or pins 145 which have one end threaded into the rings 143 while the opposite ends extend into bosses 146 formed on the sections 108. Each boss 146 has a tension stud 147 threaded thereinto and the inner end of each stud engages one end of a spring 148 the opposite end of which extends into an opening 149 formed in the pin 145. A lock nut 150 is threaded on the stud 147 to properly hold the elements in position, and the adjustability of these side rings is believed to be apparent without further comment.

Figure 11:
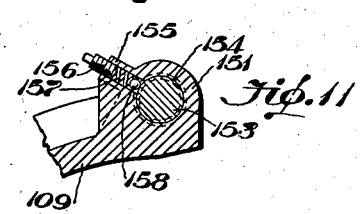
Fig. 11 is a section taken substantially on line XI—XI of Fig. 9.

In order to securely lock the chamber sections after they are moved together, one end of each portion 109 is provided with a plurality of integral, spaced, hollow, locking lugs 151, while the other end of each portion 109 is provided with similar lugs 152 (see Fig. 10), the lugs being arranged in interfitting relation (see Fig. 9), when the sections are brought together. Each lug slidably receives a tumbler 153 provided with a peripheral groove 154, and as clearly shown in Figs. 5 and 11, each lug is provided with an apertured boss 155 receiving a threaded stud 156 which engages a spring 157 acting against a ball 158 receivable in the groove 154 of the tumblers. When the tumblers are in unlocking position within the lugs, as illustrated in Fig. 10, the springs 157 in each lug will urge each ball 158 into a groove 154 to hold the tumblers against accidentally sliding out of the lugs, but the balls 158 will not prevent intentional movement of the tumblers under a sustained pressure, such as is used in locking the lugs. The outermost lugs 151 are slightly larger than the remaining lugs and cylinders 159 and 160 respectively are formed therein, by closing the ends of these two lugs with apertured heads 161 having packing glands 162 threaded therein, through which rods 163 and 164 respectively are slidable. These rods are secured to the outermost tumblers 153 and the latter serve as pistons in a manner to be described.

A switch actuating member 165 is secured to the outer end of each rod 163 to actuate a switch arm 166 of an electric switch 167 (Figs. 4 and 5), each arm 166 being provided with a roller 168 to facilitate movement thereof after engagement by the member 165. It will be noted that a similar switch 267 having an arm 266 and roller 268 is carried by plate 127, and the function of these various switches will be fully explained later. A conduit 169 communicates with the cylinder 159 and a similar conduit 170 communicates with the cylinder 160.

In Fig. 9 we have shown the chamber sections in closed relation and the tumblers 153 have been moved to the right by the admission of fluid to the cylinder 160, which movement securely locks the sections together until fluid is released from the cylinder 160 and admitted to the cylinder 159.

In Fig. 12 we have shown diagrammatically the means for effecting the operation of the various parts of the apparatus. A plurality of diaphragm valves 171, 172, 173, 174, 175, 176 and 177 are provided and as these valves are substantially identical, a description of one will suffice for all. Accordingly, in Fig. 13 we have shown valve 171 as being provided with a dome 178 having a conventional flexible diaphragm 179 arranged therein. The diaphragm is engaged by a rigid head 180 on valve stem 181 and the dome is supported by downwardly converging supports 182 which are secured to a tubular upper branch 183 of a three way valve body 184. This valve body also is provided with tubular branches 185 and 186 in coaxial alinement with each other and at right angles to branch 183. Also a downwardly extending tubular branch 187 is provided in coaxial alinement with the branch 183. A partition 188 is provided in the valve body and an opening 189 is arranged therein through which the stem 181 extends. However, the opening 189 is slightly larger in diameter than the stem in order to permit the passage of fluid through this opening under certain conditions. The lower end of the valve stem 181 is provided with a valve head 190 which is adapted to seat against the lower edges of the opening 189 when the valve stem is up, and against the upper edges of an opening 191 arranged in the entrance to branch 187, when the valve stem is down. The latter stem normally is urged upwardly by a spring 192 and downward movement of the stem is attained by admitting fluid to the dome through a conduit 193, as will be understood.

The numeral 194 designates a cam box and timing mechanism which will be more fully described later. A pressure storage and supply tank 195, adapted to receive and store fluid under a pressure of from 25 to 35 pounds per square inch, supplies fluid to the cam box 194 through a conduit 196. Conduits 197, 198, 199 and 200 lead from the cam box to conduits 201, 202, 203 and 204 respectively, which lead to the domes of the valves 171 to 177 inclusive. Pressure gauges 197', 198', 199' and 200' are arranged in conduits 197, 198, 199 and 200 respectively to indicate the amount of pressure in these conduits at all times.

A supply manifold 205 also communicates with the tank 195 and conduits 206, 207 and 208 are connected between the manifold 205 and branch 186 of valves 171, 173 and 175 respectively. Conduits 209, 210 and 211 connect conduits 206, 207 and 208 respectively to branch 187 of valves 172, 174 and 176 respectively.

An exhaust manifold 212 also is provided and conduits 213, 214 and 215 are arranged between exhaust manifold 212 and branch 187 of valves 171, 173, and 175 respectively. It will be noted that valves 172, 174 and 176 are arranged oppositely from the remaining diaphragm valves and branch 185 of these three valves appears to the right thereof instead of to the left as viewed in Fig. 12, while branches 186 of these valves likewise appear on the left instead of on the right. Accordingly, conduits 216, 217 and 218 are arranged between manifold 212 and branch 186 of valves 172, 174 and 176 respectively.

Referring now to valve 171 it will be noted that conduit 60 leading to cylinders 69 inwardly of the piston heads 94 is connected to branch 185 of this valve, while conduit 59 is connected to branch 185 of valve 172. As a result of these connections it will be apparent that when fluid passes through conduits 197 and 201 into the domes of valves 171 and 172, the valve stems 181 thereof will be depressed and communication will be had between branches 185 and 186 of the two valves while branch 187 will be shut off. Consequently fluid from manifold 205 will pass through conduit 206 into branch 186 of valve 171, and out of branch 185 of the latter valve into conduit 60, to bring the drum 71 substantially to the position shown in Fig. 3. While the drum is moving to this position any fluid in the cylinder in front of the piston head 94 will exhaust through conduit 59, branch 185 of valve 172, branch 186 of the latter valve and conduit 216 to exhaust manifold 212. Reversing the operation of the valves 171 and 172, when pressure on the diaphragms thereof is released, valve stems 181 will return to their upward position, thus closing off branches 186 of the valves and permitting communication between branches 185 and 187 thereof. Therefore, fluid will flow from manifold 205 through conduits 206 and 209 into branch 187 of valve 172, through branch 185 of the latter valve into conduit 59, thus directing fluid to the cylinders 69 in front of the piston head therein, causing the drum to move into the chamber adapted to receive it. At the same time fluid will exhaust through conduit 60, branches 185 and 187 of valve 171 and conduit 213 to manifold 212.

Referring now to valve 173, it will be noted that branch 185 thereof receives a conduit 219 which communicates with conduits 120 leading to the outer end of cylinders 117, while branch 185 of valve 174 has a conduit 220 connected thereto and leading to conduits 119 which are connected to the inner end of cylinders 117. By virtue of these connections, when fluid passes through conduits 198 and 202 to the domes of valves 173 and 174, valve stems 181 in the latter will be depressed permitting passage of fluid through manifold 205, conduit 207, branches 186 and 185 of valve 173, conduits 219 and 120 to the outer end of cylinders 117 to move the pistons 116 inwardly, whereby the chamber sections will be moved together. As the pistons 16 move inwardly fluid will be exhausted through conduits 119 and 220, through branches 185 and 186 of valve 174 and through conduit 217 into exhaust manifold 212. When the action of valves 173 and 174 is reversed, pressure on the diaphragms thereof is released and valve stems 181 are permitted to take their upward position. In this position, fluid will pass from the manifold 205 through conduits 207 and 210, through branches 187 and 185 of valve 174, through conduits 220 and 119 to the lower end of cylinders 117, thereby separating the chamber sections. As the pistons 116 move outwardly, fluid will exhaust through conduits 120 and 219, through branches 185 and 187 of valve 173, through conduit 214 to manifold 212.

Next considering valve 175, it will be observed that branch 185 thereof is connected to a conduit 221 which communicates with a conduit 222 leading to conduits 170 which communicate with cylinders 160. Likewise branch 185 of valve 176 is connected to a conduit 223 which leads to a conduit 224 having connected thereto conduits 169 which communicate with cylinders 159. When fluid passes through conduits 199 and 203 to the domes of valve 175 and 176 the valve stems therein will be depressed and fluid will be permitted to flow from manifold 205 through conduit 208, through branches 186 and 185 of valve 175, through conduits 221, 222 and 170, into cylinder 160 to move the locking lugs into locking position. During this movement, any fluid in cylinders 159 will exhaust through conduits 169, 224, 223, branches 185 and 186 of valve 176 and conduit 218 to manifold 212. A reversal of the operation of valves 175 and 176 will release the pressure on the diaphragms thereof and permit the valve stems to rise, thus permitting the passage of fluid from manifold 205 through conduits 208 and 211, through branches 187 and 185 of valve 176, through conduits 223, 224, and 169, into cylinders 159 to return the locking lugs to their normal position whereby the section cylinders may be separated. During the return movement of the locking lugs, fluid in cylinders 160 will exhaust through conduits 170, 222, 221, branches 185 and 187 of valve 175 and conduit 215 into manifold 212.

Referring to valve 177, it will be noted that conduit 56 leading to the inflatable member on the periphery of the drum is connected to branch 185 of this valve. Branch 186 of this valve is connected to a conduit 225 leading to a high pressure storage tank 226 in which fluid under relatively high pressure, for example from 150 to 200 pounds per square inch, is received and stored. Branch 187 of valve 177 is connected to exhaust manifold 212 by conduit 227. When fluid passes through conduits 200 and 204 into the dome of valve 177 to depress the valve stem thereof, high pressure fluid will pass from the tank 226 through conduits 225, branches 186 and 185 of valve 177 and conduit 56 into the inflatable member 78. As soon as pressure on the diaphragm of valve 177 is released, the high pressure fluid will return through conduit 56 into branch 185 of valve 177 and will exhaust through branch 187 of the latter valve into manifold 212 by way of conduit 227.

This high pressure fluid is not to be admitted to the inflatable member until the chamber sections are locked securely around the member, but in order to keep the inflatable member sufficiently inflated to properly receive a tire assembly placed thereon, it is desirable to admit fluid from tank 195 into the inflatable member before the drum has been moved into the chamber, and for this purpose, a supply conduit 228 is connected between manifold 205 and a valve 229 arranged in proximity to the foot lever 33. The function of the latter valve will be fully explained later. A hand valve 230 may be arranged in the conduit 228 to control the amount of fluid permitted to be passed through conduit 228. Leading from the valve 229 to conduit 56, is a conduit 231 and a pressure gauge 232 preferably is arranged in this conduit to ascertain at all times the amount of pressure passing through conduit 231 into the inflatable member.

In the manifold 205, an electrical safety valve 233 is arranged between the conduits 206 and 207 whereby the supply of fluid to conduits 207 and 208 is prevented unless this safety valve is open. Valve 233 preferably is of a standard solenoid type and is connected by electric conduits 234 to switch 267 located at the rear of the drum receiving chamber. The switch arm of the latter switch is adapted to be moved by any of the drums 71, to close a circuit permitting the passage of electric current through valve 233 to open the latter. Any suitable connections (not shown) may be used to complete the circuit through valve 233, as will readily be understood.

A second electrical safety valve 235 is arranged in conduit 204 leading to the diaphragm in valve 177 and valve 235 preferably is of the same type as valve 233. Electric conduits 236 are connected between valve 235 and conduits 237 leading to the three switches 167. The arms of the latter switches are operated by the members 165 to close a circuit permitting electric current to pass through valve 235 to open the latter. Connections to complete the circuit through valve 235 are not shown and it will be understood that any suitable connections may be used for this purpose. The time of opening of the safety valves 233 and 235 will be fully explained in discussing the operation of the apparatus.

Figure 14:
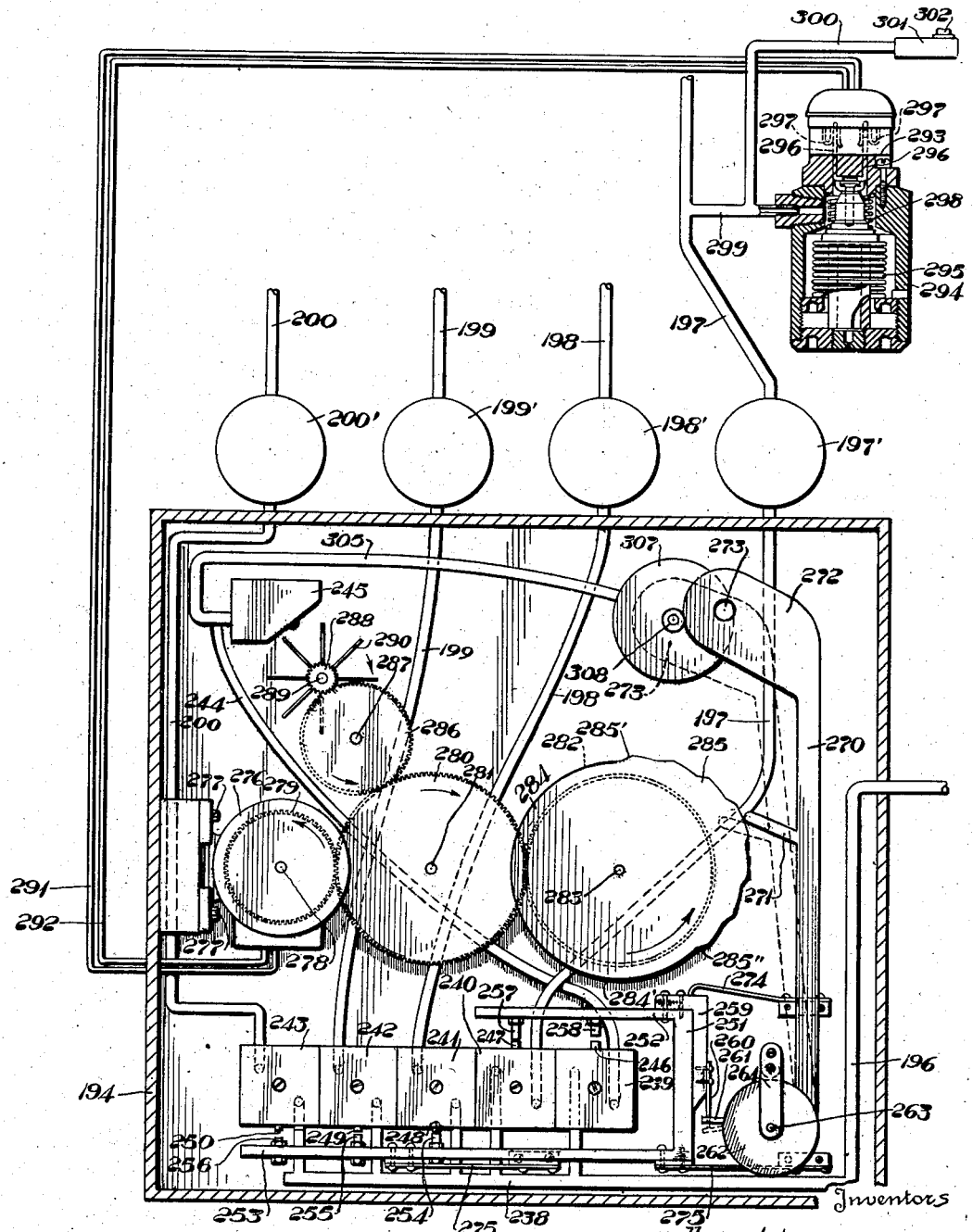
Fig. 14 is an enlarged partial detail view showing the operating parts of the starter switch and cam mechanism.

Turning now to Fig. 14, we have illustrated the interior of the cam box 194 in order better to describe the starting and timing mechanism of the apparatus. It will, of course, be understood that we do not limit ourselves to the specific starting and timing mechanism shown and that any other suitable mechanism may be used, if desired. The conduit 196 leading from supply tank 195, supplies fluid under pressure to manifold 238 which is connected to valves 239, 240, 241, 242 and 243. Valves 240, 241, 242 and 243 are connected respectively to conduits 197, 198, 199 and 200, while valve 239 is connected by conduit 244 to an air blast directing member 245, the purpose of which will be later described.

Valve stems 246, 247, 248, 249 and 250 of valves 239, 240, 241, 242 and 243 respectively, are adapted to be operated by a vertically reciprocating substantially U-shaped member 251 formed with an upper horizontal arm 252 and a lower horizontal arm 253, the latter arm being somewhat longer than the upper arm. Arm 253 is provided with spaced valve actuating members 254, 255 and 256, arranged in stepped relation whereby upon upward movement of the arm 253, member 254 first will engage valve stem 248 to open valve 241. Continued upward movement of arm 253 will result in valve 241 remaining open, while member 255 engages valve stem 249 to open valve 242. Both valves 241 and 242 then remain open while member 256 engages valve stem 250 to open valve 243. Therefore, when arm 253 reaches its limit of upward movement all three valves 241, 242 and 243 will be open and these valves will have opened successively. In returning arm 253 to its lowermost position, obviously these valves will close in the reverse order, that is, valve 243 will close first, then valve 242 and lastly valve 241.

Arm 252 will, of course, move vertically with arm 253, and the former is provided with spaced valve actuating members 257 and 258 also arranged in stepped relation with the former slightly longer than the latter. When arm 252 is in its uppermost position, members 257 and 258 will be free of contact with valve stems 247 and 246 and valves 240 and 239, therefore, will be closed. During downward movement of arm 252, members 257 and 258 will engage stems 247 and 246 successively to open valve 240 and 239. From the foregoing it will be apparent that valves 239 and 240 can be open when valves 248, 249 and 250 are closed and that when the latter valves are open the former valves can be closed. The stepped relation of member 257 and 258 will be discussed further in describing the operation of the apparatus.

Means are provided for vertically reciprocating the valve actuating member 251 and in this instance, the latter has a bracket 259 secured to the closed end thereof, to which a depending knife blade 260 is secured. This blade is engaged by a projecting arm 261 of an oscillating roller 262, rotatably mounted on a pin 263 secured in a wall of box 194 and held in place by a bracket 264 also secured to the box wall. A lever 270 has its lower end integrally formed with or otherwise suitably secured to the roller 262 and intermediate its ends this lever is provided with a cam following arm 271 while the upper end of the lever is widened as at 272 and provided with an opening 273. It will be observed that lever 270, roller 262 and projection 261, form in effect a bell crank arrangement which fulcrums on pin 263 whereby when lever 270 is moved between the dotted and full lined positions in Fig. 14, projection 261 will move in an accurate path thereby positively moving member 251 upwardly. Downward movement of the latter member will be effected by gravity assisted by the action of a flat spring 274 arranged adjacent the top of the member 251. A pair of spaced flat springs 275 are arranged below member 251 to assist in resiliently supporting the latter but the force of these springs is not sufficient to prevent downward movement of the member in the manner described. Obviously, downward movement of member 251 also tends to move lever 270 toward its dotted line position, and conversely, movement of the lever toward this position will permit controlled downward movement of member 251.

The numeral 276 indicates an electric motor, preferably secured to a wall of box 194 as shown at 277 and the shaft 278 of this motor has a pinion 279 mounted for rotation therewith. Pinion 279 meshes with gear 280 mounted on a shaft 281 and the latter gear also meshes with a gear 282 mounted on a cam shaft 283. One or more cam discs 284 are carried on shaft 283 whereby a plurality of lobes 285 are provided on the disc or discs to be engaged by the cam follower 271. Also meshing with gear 280 is a smaller gear 286 mounted on shaft 287 and the latter gear in turn meshes with a pinion 288 on a shaft 289. The latter shaft has a fluid operated paddle wheel 290 mounted thereon for a purpose to be described.

A conduit 305 is connected between conduit 244 and a cylinder 307 having a pin 308 mounted therein for movement outwardly into opening 273 at a certain time in the cycle of operation of the apparatus. A spring (not shown) normally holds the pin 308 retracted within the cylinder 307.

Electric conduits 291 and 292 are connected between motor 276 and a fluid operated switch 293 whereby when the latter switch is closed an electric circuit is completed to the motor to start the latter. The switch 293 may be of any suitable type and in the present instance, we have illustrated a well known bellows operated type which comprises a housing 294 having a bellows 295 mounted for vertical movement therein. Operatively connected to the bellows is a pair of switch arms 296 which are movable into and out of circuit closing relation with a pair of contact points 297 and a spring 298 is adapted to normally urge the arms 296 into contact with points 297 when the bellows is not compressed. The switch is operated whereby air enters the housing from conduit 197 through conduit 299 and compresses the bellows thereby breaking the contact between arms 296 and points 297 and consequently breaking the electric circuit. A conduit 300 leads from conduit 299 to a starting valve 301 which normally is closed but which may be opened by depressing button 302 to permit fluid to pass through this valve to the atmosphere. Obviously, when pressure is maintained in conduit 299 to break the electric circuit, this pressure may be relieved by opening valve 301 permitting expansion of the bellows whereby spring 298 will act to move arms 296 into contact with points 297, thus completing the electric circuit to the motor to start the latter. While we have not shown the motor and switch connections to a source of electric current, it will be apparent that any desirable means may be utilized for this purpose.

Figure 8:
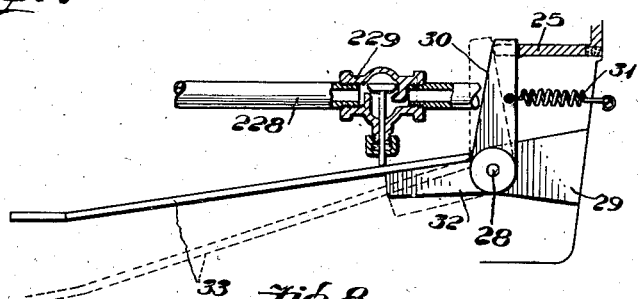
Fig. 8 is an enlarged section through one of the operating valves.

The operation of the apparatus is as follows:

An unbonded tire assembly, preferably, but not necessarily, formed in accordance with the disclosure in the aforesaid pending application is mounted on each of the drums 71 and the turret 20 is rotated until one of the drums reaches a position in alinement with the drum receiving chamber. The position of this unbonded assembly on a drum is substantially as shown in Fig. 3, wherein it will be seen that all of the bands have not been turned around the bead portions of the assembly. The correct position of each drum with respect to the chamber is assured by virtue of the alining notches 27 which receive the arm 30 of the foot operated lever and maintain the turret in fixed position until arm 30 is moved out of securing position. As before stated, when lever 30 is in any one of the notches 27, ports 55, 57 and 58 of the distributor 52 will be properly alined with a set of openings 49, 50 and 51 of the housing 48 to permit the passage of fluid when the proper valves are open, into the cylinder 69 and inflatable member 78 associated with the drum 71 that is alined with the receiving chamber. The remaining drums 71, not being in proper position, will not be affected by the operation of the drum that is in alinement with the chamber. As soon as lever arm 30 is secured in a notch 27, valve 229 (see Figs. 8 and 12) will be opened to permit the passage of fluid from supply tank 195 through conduits 228 and 231 into conduit 56 leading to inflatable member 78 of the alined drum, hand valve 230 being operated to regulate the amount of air passing into the inflatable member. As tank 195 contains air only of a pressure up to 25 or 35 pounds per sq. in., the pressure admitted to the inflatable member at this time is sufficient only to fill out the inflatable member to proper contour to correctly hold the unbonded tire assembly whereby the latter will properly be engaged by the chamber sections when they are brought together.

At this time the cam disc 284 is in a position whereby the inclined surface of the first lobe 285' is engaged by the outer end of the follower 271 which together with the remaining parts of lever 270, occupy a position slightly beyond the dotted line position of Fig. 14 and toward the full line position thereof. Valve actuating arms 252 and 253 are in positions whereby valves 239, 241, 242 and 243 are closed while valve 240 is open. Valve 240 being open, fluid will pass from supply tank 195, through conduit 196, manifold 238, valve 240, conduits 197 and 201 into the domes of diaphragm valves 171 and 172 respectively. This permits the passage of fluid from manifold 205 through conduit 206, valve 171 and conduit 60 to maintain the alined drum 71 in its innermost position as shown in Fig. 3.

As long as pressure is present in conduit 197, it will be supplied to conduits 299 and 300 and consequently switch arms 296 will be held out of engagement with contact points 297.

With the elements in the positions stated, the apparatus is started by depressing button 302 to open valve 301. This button may be located whereby the operator may press it with either a foot or a hand, but preferably it is located so he may step on it with a foot. Opening valve 301 relieves the pressure on the bellows 295 and permits spring 298 to urge switch arms 296 into contact with points 297, thereby starting motor 276. By virtue of the gearing utilized, rotation of the motor shaft will rotate the cam disc 284 in a counter-clockwise direction thereby causing the several cam lobes to successively engage follower 271 and urge the lever 270 intermittently toward the full line position in Fig. 14. This position will be reached when the outer surface of the outermost cam lobe has been contacted by the follower and thereafter the remaining cam lobes will control the return of lever 270 to its dotted line position.

As the cam disc begins to rotate, the follower will move off the inclined surface of lobe 285' onto the outer surface of this lobe and will move lever 270 a short distance toward its full line position, thereby moving member 251 upwardly a short distance. The mechanism is constructed whereby this upward movement of member 251 is sufficient to move member 257 out of contact with valve stem 247, thereby closing valve 240 to cut off the pressure in conduit 197. As soon as the pressure in the latter conduit is cut off as stated, it will be apparent that starter button 302 may be released by the operator, as the spring in switch 293 then will maintain the electric circuit closed to the motor until pressure again is admitted to conduit 197.

Release of pressure in conduit 197 also will relieve the pressure on the diaphragms of valves 171 and 172, permitting stems 181 of these valves to rise, thereby allowing fluid to pass from manifold 205, through conduits 206 and 209, valve 172, conduit 59 into cylinder 69 of the alined drum to move the latter and the cylinder horizontally into the receiving chamber. As the drum moves into the chamber, fluid will exhaust through conduit 60, valve 171 and conduit 213, into exhaust manifold 212. Valve 240 will remain closed until, in the cycle of operation, it becomes necessary to open it again.

The drum is centered properly in the chamber by virtue of the conical or tapered opening 99 in plug 89 which receives the conical or tapered end 133 of shaft 125. When the end of this shaft fits snugly within the opening, the drum is centered correctly and in reaching this centered position a portion of the drum spider 72 will have moved arm 266 of switch 267 to open electrical safety valve 233. This safety valve cannot be opened unless the drum is properly centered, so that incorrect use of the apparatus is not permitted, as no fluid will pass to conduits 207 and 208 unless the safety valve is opened.

Continued rotation of cam disc 284 brings the next cam lobe into contact with the follower and thereby raises member 251 an additional short distance. This further upward movement of member 251 is sufficient to cause member 254 to actuate stem 248 and thus to open valve 241 admitting pressure to conduit 198. Admission of pressure to the latter conduit acts on the diaphragm of valves 173 and 174 to lower the stems 181 of these valves, permitting the passage of fluid from manifold 205, assuming, of course, that safety valve 233 is open, through conduit 207, valve 173, conduits 219 and 120 into the outer ends of cylinders 117, thereby moving the chamber sections radially inwardly to closed position surrounding the drum and tire band assembly mounted thereon. During inward movement of the chamber sections, fluid will exhaust from cylinders 117 through conduits 119 and 220, valve 174 and conduit 217, into exhaust manifold 212. Before the chamber sections have been moved together, the bead engaging flanges 143 will have been adjusted to properly receive the beads of the tire assembly and upon coming together the dowel pins 142 of each section fit snugly in the openings provided for same whereby a complete substantially annular chamber is formed surrounding the tire assembly. The position of the drum and tire assembly within the closed chamber is shown in Fig. 15 and it will be noted that the rings or flanges 143 press the edges of the bands around the bead portions of the tire, while the tread band fits snugly against the chamber walls.

Valve 241 will remain open as long as it is necessary to keep the chamber sections together and the next cam lobe on disc 284 will move member 251 upwardly sufficiently to open valve 242 and admit pressure to conduit 199. When pressure is admitted to this conduit, the stems 181 in valves 175 and 176 will be forced downwardly to permit fluid to pass from manifold 205, through conduit 208, valve 175, conduits 221, 222 and 170 into cylinders 160, thus moving the tumblers 153 into locking position shown in Fig. 9. During this movement of the tumblers, fluid will exhaust from cylinders 159 through conduits 169, 224 and 223, valve 176 and conduit 218 into exhaust manifold 212. When locked, it will be apparent that the chamber sections must remain together until the locks are released. As before stated, each of the tumblers 153 in cylinders 159 has a switch actuating member 165 associated therewith and when the tumblers properly move to locked position, the members 165 will actuate the arms 166 of each of the three switches 167 to open the electrical safety valve 235 in conduit 204. The hook-up of the switches 167 preferably is such that all of these switches must be closed before safety valve 235 can open and unless all the locking tumblers properly are in locked position the switches cannot be closed. This arrangement therefore insures complete locking of the chamber sections before any high pressure fluid can be admitted to the inflating member 78.

As rotation of cam disc 284 continues, the outmost lobe next engages the follower and moves member 251 further upwardly causing member 258 to engage stem 250 thus opening valve 243 to admit fluid under pressure to conduit 200. Pressure in the latter conduit will act on the diaphragm of valve 177, assuming, of course, that safety valve 235 is open, to force valve stem 181 downwardly, whereby high pressure fluid will pass from the high pressure tank 226, through conduit 225, valve 177, conduit 56 and the remaining passages into the inflating member 78 to expand the latter. The expansion pressure preferably is from 150 to 200 pounds per sq. in., and in practice we find it desirable to use a pressure of 150 pounds per sq. in. As previously stated, the thinnest portion of each member 78 is located approximately in the center of the outer wall thereof and this construction insures initial expansion of the member at the center. As a consequence, when the high pressure fluid is admitted to the member 78, a compacting pressure will be initially exerted radially outwardly substantially at the center of the tire assembly, pressing the center of the latter against the chamber walls. After expansion at the center of the assembly, the compacting pressure operates progressively thereon from the center to the edges of the assembly, thereby forcing substantially all of the air therefrom and effectively uniting or bonding the components of the tire together in one operation without tension.

This compacting pressure preferably is exerted for approximately three seconds during which time, the follower will have reached the end of the outer surface of the outermost cam lobe, from which the follower will begin to move back toward its dotted line position in Fig. 14. In returning, the follower first moves onto a lobe similar to the lobe which effects the opening of valve 242. Naturally, when the follower moves off of the outermost lobe, the member 251 will be lowered sufficiently to close valve 243, thereby cutting off the flow of high pressure fluid to the inflating member 78. As soon as valve 243 is closed, stem 181 of valve 177 will rise thereby permitting the high pressure fluid to exhaust through conduit 56, valve 177 and conduit 227, into exhaust manifold 212.

As the cam disc continues to rotate, member 251 will move downwardly closing valve 242 which will reverse the fluid action on the locking tumblers 153 and return them to unlocked position. Further downward movement will close valve 241 which will reverse the flow of fluid in cylinders 117 to separate the chamber sections. At this point in the cycle of operation the cam follower will be riding on the outer surface of the last lobe, which is indicated by the numeral 285″. As the follower reaches a point substantially midway of the inclined surface of this last lobe, member 251 will be lowered sufficiently to open valve 249 and admit pressure to conduit 197 which will reverse the operation of the drum 71 and cylinder 69 and retract same from the chamber.

Also, the admission of fluid to conduit 197 will operate the bellows switch 293 to break the electrical circuit therethrough and stop motor 276. When the motor stops, the inertia of the moving parts is sufficient to rotate the cam disc 284 far enough to permit the cam follower to pass off the inclined surface of lobe 285″ onto the innermost surface 284′ of the cam disc. As the follower moves from the middle of the inclined surface of lobe 285″ onto surface 284′ the member 251 will be lowered sufficiently to permit member 258 to engage stem 246 to open valve 239. With the latter valve open, fluid is admitted to conduits 244 and 305. From conduit 244 fluid passes into the air blast directing member 245 and against paddle wheel 290 to rotate the latter, thereby continuing rotation of the cam disc, by virtue of the gearing associated therewith, until the first cam lobe 285′ is again brought adjacent the cam follower. As soon as the follower reaches a point about midway on the inclined surface of lobe 285′ the member 251 will have raised sufficiently to close valve 239, thus shutting off the flow of fluid to the paddle wheel and bringing the mechanism to a complete stop.

If it were possible at this time for the follower to continue on up the inclined surface of lobe 285′ onto the outer surface thereof, it will be apparent that the apparatus would start on a new cycle, but a positive stop for the mechanism is provided by the pin 308. When valve 239 is open, fluid in conduit 305 passes into cylinder 307 and forces pin 308 outwardly into the opening 273 of lever 270, the latter being approximately in the dotted line position of Fig. 14 when this pin is operated, whereby the pin and opening are alined with each other. With the pin in this opening it will be obvious that movement of the lever 270 from its dotted line position toward its full line position is prevented except for a slight movement permitted by virtue of the play of the pin in the opening due to the fact that the latter is slightly larger than the pin. While the follower is in contact with surface 284' of the cam disc, pin 308 is substantially concentric with opening 273, but as soon as the follower starts up the inclined surface of lobe 285', the follower and lever 270 start to move toward their full line position and it is this movement that is arrested as soon as the pin engages the wall of opening 273, substantially as indicated in Fig. 14. Pin 308 therefore, brings the follower to rest substantially midway of the inclined surface of lobe 285' and it will be remembered that when the latter reaches this position, valve 239 closes, thus relieving the pressure on pin 308 and permitting the spring in cylinder 307 to retract the pin whereby a new cycle may be initiated by pressing the starter button 302.

After the cycle of operation has been completed, foot lever 33 is depressed to disengage arm 30 from notch 27 to allow the turret to be turned manually until the next drum is brought into alinement with the receiving chamber. It will be observed by reference to Fig. 8 that valve 229 will close when lever 33 is depressed thus shutting off the flow of fluid to the inflation member of any drum and accordingly valve 229 will remain closed until arm 30 again is in proper position in one of the notches 27. The bonded tire assembly may be removed from its drum, given a toroidal shape, and vulcanized in the usual manner.

It is believed to be apparent that we have provided an apparatus well adapted to accomplish its purposes and to simultaneously bond together the elements of an unvulcanized tire assembly without tension. The operation of the apparatus is continuous after the starting button has been pressed and many of the features of the device including the provisions for the safe operation thereof obviously are novel.

Although we have illustrated and described one preferred embodiment of the invention, it will be apparent to those skilled in the art that the invention is not so limited but that various modifications may be made therein without departing from the spirit of the invention or the scope of the sub-joined claims.

What we claim is:

1. In tire building apparatus of the character described, in combination, a rotatable turret, a plurality of spaced tire band receiving drums reciprocally mounted on said turret, means for successively locking each of said drums in alinement with a single drum receiving chamber, and means for reciprocating each drum only when it becomes alined with said chamber.

2. In tire building apparatus of the character described, in combination, a stationary support, a rotatable support mounted thereon, a plurality of non-reciprocating pistons mounted on said rotatable support, a reciprocating cylinder coacting with each piston, a tire band supporting member mounted for movement with each cylinder, means for successively alining each of said band supporting members with a receiving chamber therefor, and means for reciprocating the cylinder of each member when it becomes alined with said chamber.

3. In tire building apparatus of the character described, in combination, a rotatable turret, a plurality of non-reciprocating pistons mounted on said turret, a reciprocating cylinder coacting with each piston, a tire band receiving drum mounted for movement with each cylinder, means for successively locking each of said drums in alinement with a drum receiving chamber, and means for reciprocating the cylinder of each drum when it becomes alined with said chamber.

4. In tire building apparatus of the character described, in combination, a frame, a plurality of movable arcuate sections mounted in said frame, means for moving said sections radially to form a substantially annular chamber the walls of which are defined by said sections, and means for locking said sections together after the chamber is formed.

5. In tire building apparatus of the character described, in combination, a frame, a plurality of movable arcuate sections mounted in said frame, means for moving said sections radially to form a substantially annular chamber the walls of which are defined by said sections, means for guiding said sections in their movement, and means for locking said sections together after the chamber is formed.

6. In tire building apparatus of the character described, in combination, a frame, a plurality of movable arcuate sections mounted in said frame, means for moving said sections radially to form a substantially annular chamber the walls of which are defined by said sections, and means separate from said moving means for insuring simultaneous movement of said sections, said last-named means including racks connected to each of said sections and meshing with a common pinion.

7. In tire building apparatus of the character described, in combination, a frame, a plurality of movable arcuate sections mounted in said frame, means for moving said sections radially to form a substantially annular chamber the walls of which are defined by said sections, means for insuring simultaneous movement of said sections, and means for guiding said sections in their movement.

8. In tire building apparatus of the character described, in combination, a frame, a plurality of movable arcuate sections mounted in said frame, means for moving said sections radially to form a substantially annular chamber the walls of which are defined by said sections, means for insuring simultaneous movement of said sections, and means for locking said sections together after the chamber is formed.

9. In tire building apparatus of the character described, in combination, a frame, a plurality of movable arcuate sections mounted in said frame, means for moving said sections radially to form a substantially annular chamber the walls of which are defined by said sections, means for insuring simultaneous movement of said sections, means for guiding said sections in their movement, and means for locking said sections together after the chamber is formed.

10. In tire building apparatus of the character described, in combination, a frame, a plurality of movable arcuate sections mounted in said frame, and means automatically first to move said sections simultaneously radially to form a substantially annular chamber the walls of which are defined by said sections, and then to lock said sections together.

11. In tire building apparatus of the character described, in combination, a frame, a plurality of arcuate sections mounted in said frame and movable radially to form a substantially annular chamber the walls of which are defined by said sections, and an adjustably mounted arcuate flange carried on each side of each section.

12. In tire building apparatus of the character described, in combination, a frame, a plurality of movable arcuate sections, a cylinder for each section carried by the frame, a piston slidably mounted in each cylinder, a piston rod connected between each piston and one of the sections, guides arranged on each section and movable in guideways formed in the frame, and means for actuating said pistons to move said sections radially to form a substantially annular chamber the walls of which are defined by said sections.

13. In tire building apparatus of the character described, in combination, a frame, a plurality of movable arcuate sections, a cylinder for each section carried by the frame, a piston slidably mounted in each cylinder, a piston rod connected between each piston and one of the sections, means for actuating each piston to move said sections radially to form a substantially annular chamber the walls of which are defined by said sections, and means for locking said sections together after the chamber is formed.

14. In tire building apparatus of the character described, in combination, a frame, a plurality of movable arcuate sections, a cylinder for each section carried by the frame, a piston slidably mounted in each cylinder, a piston rod connected between each piston and one of the sections, means for actuating each piston to move said sections radially to form a substantially annular chamber the walls of which are defined by said sections, and means separate from said actuating means for insuring simultaneous movement of said sections.

15. In tire building apparatus of the character described, in combination, a frame, a plurality of movable arcuate sections, a cylinder for each section carried by the frame, a piston slidably mounted in each cylinder, a piston rod connected between each piston and one of the sections, means for actuating each piston to move said sections radially to form a substantially annular chamber the walls of which are defined by said sections, means for insuring simultaneous movement of said sections, and means for locking said sections together after the chamber is formed.

16. In tire building apparatus of the character described, in combination, a frame, a plurality of arcuate sections mounted in said frame and movable radially to form a substantially annular chamber the walls of which are defined by said sections, a toothed arm carried by each of said sections, and a pinion having teeth in constant mesh with the teeth of each of said arms whereby to insure simultaneous movement of said sections.

17. In tire building apparatus of the character described, in combination, a frame, a plurality of arcuate sections mounted in said frame and movable radially to form a substantially annular chamber the walls of which are defined by said sections, a plurality of bosses carried on each side of each of said sections, an adjustable spring pressed pin arranged in each boss, and an arcuate flange secured to the pins of each section respectively.

18. In tire building apparatus of the character described, in combination, a frame, a plurality of arcuate sections mounted in said frame and movable radially to form a substantially annular chamber the walls of which are defined by said sections, spaced interfitting lugs arranged on adjacent ends of said sections respectively, and a tumbler in each lug movable whereby a portion of each tumbler will extend into the next adjacent lug after the chamber has been formed to lock the sections together.

19. In tire building apparatus of the character described, in combination, a frame, a plurality of movable arcuate sections mounted in said frame, and fluid operated means for moving said sections radially to form a substantially annular chamber the walls of which are defined by said sections and for locking said sections together after the chamber has been formed.

20. In tire building apparatus of the character described, in combination, a frame, a plurality of movable arcuate sections mounted in said frame, fluid operated means for moving said sections radially to form a substantially annular chamber the walls of which are defined by said sections and for locking said sections together after the chamber has been formed, and mechanical means for insuring simultaneous movement of said sections.

21. In tire building apparatus of the character described, in combination, a plurality of spaced movable arcuate sections, a reciprocating tire band supporting member, means for moving said member into a position substantially centralized with respect to said sections, means for moving said sections together to form a continuous wall around said member, and means for locking said sections together.

22. In tire building apparatus of the character described, in combination, a plurality of spaced movable arcuate sections, a reciprocating tire band supporting member, means for moving said member into a position substantially centralized with respect to said sections, means for moving said sections together to form a continuous wall around said member, means for locking said sections together for a predetermined length of time, means for unlocking said sections, means for separating said sections, and means for returning said member to its initial position.

23. In tire building apparatus of the character described, in combination, a plurality of spaced radially movable arcuate sections, a reciprocating tire band supporting member, means for moving said member into a position substantially centralized with respect to said sections, means for moving said sections together to form a continuous wall around said member, means for locking said sections together for a predetermined length of time, means for unlocking said sections, means for separating said sections, means for returning said member to its initial position, and means automatically and successively operating all of said other means.

24. In tire building apparatus of the character described, in combination, a plurality of spaced radially movable arcuate sections, a reciprocating tire band supporting member having an expansible outer surface, means for moving said members into a position substantially centralized with respect to said sections, means for moving said sections together to form a continuous wall around said member, means for locking said sections together, means for expanding the outer surface of said member for a predetermined length of time while the sections are locked together, means for unlocking said sections at the expiration of said time, means for separating said sections, and means for returning said member to its initial position.

25. In tire building apparatus of the character described, in combination, a plurality of spaced movable arcuate sections, a reciprocating tire band supporting member having an expansible outer surface, means for moving said member into a position substantially centralized with respect to said sections, means for moving said sections together to form a continuous wall around said member, means for locking said sections together, means for expanding the outer surface of said member for a predetermined length of time while the sections are locked together, means for unlocking said sections at the expiration of said time, means for separating said sections, means for returning said member to its initial position, and means automatically and successively operating all of said other means.

26. A combination as recited in claim 25 in which means are provided to prevent moving together of the sections to form a continuous wall unless the band supporting member is properly centralized with respect to the sections.

27. A combination as recited in claim 25 in which means are provided to prevent expansion of the outer surface of the band supporting member unless the sections are properly locked together.

28. A combination as recited in claim 25 in which means are provided to prevent moving together of the sections to form a continuous wall unless the band supporting member is properly centralized with respect to the sections, and in which means are provided to prevent expansion of the outer surface of the band supporting member unless the sections are properly locked together.

29. In tire building apparatus of the character described, in combination, a chamber having an inner face conforming in shape and size to the outer face of a bonded tire band, means including an inflatable member for supporting assembled but unbonded tire band elements in said chamber, and means for applying a compacting pressure in said member to force said elements against the inner chamber face whereby to bond the elements simultaneously, said inflatable member having its thinnest portion at the center of its outer surface for insuring the operation of the pressure progressively from the center to the edges of said elements.

30. In tire building apparatus of the character described, in combination, means including a member having an expansible surface for supporting assembled but unbonded tire band elements, a surface encircling said elements and conforming in shape and size to the outer face of a bonded tire band, and means for inflating said member to force the unbonded elements against the encircling surface to bond the elements together simultaneously by a compacting pressure, said expansible surface being formed with its thinnest portion at the center thereof whereby the pressure applied to the elements will operate thereon progressively from the center to the edges of the elements.

31. In tire building apparatus of the character described, in combination, means including a member having a flexible, expansible outer surface for supporting assembled but unbonded tire band elements, and means for bonding said elements together by forcing them against an unyielding surface by a compacting pressure in said expansible member, the outer surface of said member being thinned out at the center thereof whereby the pressure applied will operate progressively from the center to the edges of the elements.

32. A drum of the character described having an inflatable outer surface formed with its thinnest portion substantially at the center thereof.

33. A drum of the character described having a flexible, expansible outer surface formed with its thinnest portion substantially at the center of said surface.

34. A drum of the character described having an inflatable member arranged on its outer periphery, the outer surface of said member being formed with its thinnest portion substantially at the center thereof.

35. A drum of the character described having an expansible surface, said surface being formed with its thinnest portion substantially at the center thereof.

36. In tire-building apparatus of the character described, in combination, a frame, a plurality of movable arcuate sections mounted in said frame, means for moving said sections radially to form a substantially annular chamber, the walls of which are defined by said sections, and means separate from said moving means for insuring simultaneous movement of said sections, comprising a member directly connected to each section and an equalizing member connected directly to each of said first members for equalizing the amount of movement of each of said first members and consequently of said sections.

37. In tire-building apparatus of the character described, in combination, a frame, a plurality of movable arcuate sections mounted in said frame, fluid-operated means for moving the said sections inwardly to form a substantially annular chamber, the walls of which are defined by said sections, and means for locking said sections together after the chamber has been formed.

38. In tire-building apparatus of the character described, in combination, a frame, a plurality of movable arcuate sections mounted in said frame, fluid-operated means for moving the said sections inwardly to form a substantially annular chamber, the walls of which are defined by said sections, and means for locking said sections together after the chamber has been formed, comprising interfitting lugs on adjacent sections having openings aligned with each other when said sections are in their operative positions, at least one of said openings having a tumbler therein mounted for movement into an adjacent opening in an adjacent section for locking said adjacent sections together.

39. In tire-building apparatus of the character described, in combination, a plurality of spaced movable arcuate sections, a reciprocating tire band supporting member having an expansible outer surface upon which a tire band is to be positioned, means for moving said member into a position substantially centralized with respect to said sections, means for moving said sections together to form a continuous wall around said member, means for locking said sections together, means for expanding the outer surface of said member, and means for preventing movement of said sections together to form a continuous wall unless the band-supporting member is properly centralized with respect to the sections.

40. In tire-building apparatus of the character described, in combination, a plurality of spaced movable arcuate sections, a reciprocating tire band supporting member having an expansible outer surface upon which a tire band is to be positioned, means for moving said member into a position substantially centralized with respect to said sections, means for moving said sections together to form a continuous wall around said member, means for locking said sections together, means for expanding the outer surface of said member, and means for preventing expansion of the outer surface of the band-supporting member unless the sections are properly locked together.

41. In tire-building apparatus of the character described, in combination, a plurality of spaced movable arcuate sections, a reciprocating tire band supporting member having an expansible outer surface upon which a tire band is to be positioned, means for moving said member into a position substantially centralized with respect to said sections, means for moving said sections together to form a continuous wall around said member, means for locking said sections together, means for expanding the outer surface of said member, and means for preventing movement of said sections together to form a continuous wall unless the band-supporting member is properly centralized with respect to the sections, and means for preventing expansion of the outer surface of the band-supporting member unless the sections are properly locked together.

42. In a tire-building apparatus of the character described, in combination, means including an inflatable member having a flexible, expansible outer surface for supporting assembled but unbonded tire band elements, and means for bonding said elements together by forcing them against an encircling surface by a compacting pressure in said inflatable member, the outer surface of said member being thinned out at the center thereof, whereby the pressure applied will operate progressively from the center to the edges of the elements.

43. A tire band supporting former having an inflatable outer surface formed with its thinnest portion substantially at the center thereof.

44. In a tire-building apparatus the combination with a chamber having an inner peripheral wall, a tire band support reciprocable into and out of said chamber, means for moving said tire band support into said chamber, means for compacting said tire bands between said wall and said tire band supporting means, means for moving said tire band supporting means out of said chamber, and means automatically operative to complete a single cycle of movements of all of said means to first move said supporting means into said chamber, subsequently compact said tire bands, then withdraw said tire band supporting means from said chamber and means for eventually stopping the actuation of all of said means before a similar cycle of operations takes place in said apparatus.

45. In a tire-building apparatus the combination with a chamber having an inner peripheral wall composed of movable sections mounted for movement outwardly to an inoperative position from the position in which they form said chamber, a tire band support reciprocable into and out of said chamber, means for moving said tire band support into said chamber, means for moving said sections from said inoperative position to the position in which said sections form said chamber means for compacting said tire bands between said wall and said tire band supporting means, means for moving said sections away from said tire band supporting means, means for moving said tire band supporting means out of said chamber and means automatically operated to complete a single cycle of movement of all of said means in the following order, first to move said supporting means into said chamber, thereafter moving said sections from their inoperative position to the position in which they form said chamber, thereafter compacting said tire bands between said wall and tire band support, thereafter moving said sections to their inoperative position and thereafter withdrawing said tire band supporting means from its position within said chamber, and means for eventually stopping the actuation of all of said means after said cycle of operations is completed and before a similar cycle of operations takes place in said apparatus.

46. In a tire-building apparatus of the character described, in combination, a plurality of sections mounted for movement to a position where they form a chamber defined by said sections and means for locking said sections together when they are in that position.

47. In a tire-building apparatus of the character described, in combination, a plurality of sections mounted for movement to a position where they form a chamber defined by said sections and means for locking said sections together when they are in that position, comprising at least one lug on each end of each section having openings therein arranged to be in alignment with the openings in adjacent sets of lugs when said chamber is formed, a tumbler in at least one of each set of said aligned openings, and means for moving said tumblers partially from its opening into an adjacent opening.

48. In a tire-building apparatus of the character described, in combination, a plurality of sections mounted for movement to a position where they form a chamber defined by said sections and means for locking said sections together when they are in that position, comprising at least one lug on each end of each section having openings therein arranged to be in alignment with the openings in adjacent sets of lugs when said chamber is formed, a tumbler in at least one of each set of said aligned openings and fluid pressure means for moving said tumblers partially from its opening into an adjacent opening.

49. In tire-building apparatus of the character described, the combination with a stationary support having fluid passages therethrough connected to a source of fluid supply, a turret having a plurality of similar units mounted thereon and spaced about said turret, separate fluid pressure means for actuating each of said units, fluid passages leading to each of said separate fluid-pressure means having terminal ends thereon adjacent said stationary support and adapted to register with said passages in said stationary support when the respective unit which is to be operated is brought into operative position by rotation of said turret, the others of said units remaining idle and selectively becoming operatively connected to said first fluid pressure passages when the turret is rotated to bring that unit into operative position.

50. In tire-building apparatus the combination with a turret having a plurality of fluid pressure operating means mounted thereon, tire-building units connected, one to each of said fluid-pressure means and actuated thereby, a stationary means on which said turret is rotatably mounted, stationary passages in said means adapted to communicate with each of said fluid pressure means in turn only when they are moved into operative position for actuating the tire-building unit.

51. A device as set forth in claim 50 in which said fluid in said fluid pressure means remains in said fluid pressure means to hold said unit in inoperative position until said turret is moved to a position in which the fluid pressure means connected to that unit is again in communication with the passages in said stationary means.

WILL C. STATE.
MEINDERT LAMMERTSE.
CHARLES E. GARDNER.